United States Patent [19]
Georgitsis et al.

[11] Patent Number: 5,141,388
[45] Date of Patent: Aug. 25, 1992

[54] APPARATUS FOR TURNING A PACKAGE

[75] Inventors: Nikolaos Georgitsis, Osercappeln; Walter Waschatko, Nackenheim, both of Fed. Rep. of Germany

[73] Assignee: Tetra Pak Holdings S.A., Pully, Switzerland

[21] Appl. No.: 447,383

[22] Filed: Dec. 7, 1989

[30] Foreign Application Priority Data

Dec. 7, 1988 [DE] Fed. Rep. of Germany ....... 3841171

[51] Int. Cl.⁵ .......................................... B65G 47/248
[52] U.S. Cl. ..................................... 414/783; 414/728; 414/738; 414/742; 414/761; 414/763; 414/773; 414/779; 414/782
[58] Field of Search ............ 198/403, 409, 412, 468.2; 414/738, 741, 742, 728, 758, 761, 763, 773, 779, 782, 783, 225, 751, 420, 764, 766, 767, 765, 639, 642, 648, 649, 650, 744.4, 745.8, 746.3, 788.5, 788.6

[56] References Cited

U.S. PATENT DOCUMENTS

| | | | |
|---|---|---|---|
| 1,679,527 | 8/1928 | Jaeger | 414/783 X |
| 1,909,813 | 5/1933 | Crosbie | 414/741 X |
| 2,333,118 | 11/1943 | Olsen | 414/420 X |
| 2,557,228 | 6/1951 | King et al. | 414/765 |
| 2,643,102 | 6/1953 | Bashford | 414/420 X |
| 3,189,158 | 6/1965 | Lucas | 198/412 X |
| 3,830,378 | 8/1974 | Key et al. | |
| 3,942,663 | 3/1976 | Wentzel | 414/420 |
| 4,220,239 | 9/1980 | Prichard, Jr. | 198/403 |
| 4,596,107 | 6/1986 | Pfleger, Sr. | 53/53 |
| 4,611,454 | 9/1986 | Proepper | 53/307 |
| 4,844,682 | 7/1989 | Edelhoff | 414/742 X |

FOREIGN PATENT DOCUMENTS

| | | |
|---|---|---|
| 1205014 | 11/1965 | Fed. Rep. of Germany . |
| 66/2744 | 6/1969 | Fed. Rep. of Germany . |
| 1955291 | 5/1971 | Fed. Rep. of Germany . |
| 84/2517 | 3/1985 | Fed. Rep. of Germany . |
| 3417150 | 11/1985 | Fed. Rep. of Germany . |
| 59040 | 12/1967 | German Democratic Rep. . |
| 236503 | 6/1987 | German Democratic Rep. . |
| 59-39627 | 3/1984 | Japan .................................. 414/765 |
| 1212521 | 11/1970 | United Kingdom . |
| 2185954 | 8/1987 | United Kingdom . |

Primary Examiner—Robert J. Spar
Assistant Examiner—Janice Krizek
Attorney, Agent, or Firm—Howard M. Ellis; Michael L. Dunn

[57] ABSTRACT

An apparatus for turning over a package (9) through 180° out of a first position (I) on a supply conveyor (6) into a second position (II) on a removal conveyor (12), a frame (2) mounted on the floor (1) being provided to support a propulsion unit provided with a driving motor (13). To provide a turn-over apparatus for a tubular package, the propulsion unit (15, 20) comprises a movable linear carriage driven between the two positions (I, II) and a stationary slotted guide (20) with a control cam (22) and at least one gripper element is movably mounted in the linear carriage and is rigidly connected to a follower roller (24) guided in the control cam (22).

9 Claims, 5 Drawing Sheets

APPARATUS FOR TURNING A PACKAGE

The invention relates to an apparatus for turning a package through 180° out of a first position on a supply conveyor into a second position on a delivery conveyor, a frame fixed to the floor being provided to support a propulsion unit provided with a driving motor.

Package producing machines are known in which packages to hold liquids are manufactured, filled, sealed and carried away. Such machines produce packages which have tubular side walls, a lid and a bottom, at least the side walls and frequently also the bottom consisting of synthetic plastics coated carrier material so that the package is fluid-tight. With such machines, it is possible to produce packages of circular or tetragonal cross-section, one package having already been produced which is tetragonal at the bottom while the cross-section at the top is circular. Where many packages are concerned, the bottom and top are differently shaped, constructed, disposed and may possibly even be of different materials. For example, the bottom may consist of a carrier material coated with a synthetic plastics material and produced by a folding process and which will hereinafter be referred to generally as coated paper, while the top may be injection moulded into position and consist of synthetic plastics without any carrier material.

It is well known that a package of the above-described type stands on its top when it leaves the production machine and is transported via the so-called supply conveyor in this position. These individual packages are intended often to be grouped together into one collective bundle for storage, transport and to be offered to the end user, in which case it will be appreciated that the lid or top should be uppermost. Therefore, the object of the invention is to provide an apparatus by which a package having tubular side walls can be turned out of a first position on a supply conveyor and through 180° into a second position on a removal conveyor.

It is true that turnover means of a similar type have already been suggested but in these cases the package after it has been moved sideways by a conveyor belt is moved downwards to be tipped over and so that it can slide, which is why packages often assume an oblique position on the delivery conveyor so that they then jam or sometimes whole groups of packages jam together and foul the guide means. In the past, with this kind of turnover process, packages have even burst, which is most undesirable in the case of a filling plant, e.g. a dairy, when the packages produced are filled with milk.

According to the invention, an apparatus of the type mentioned at the outset and intended for a reliable turnover operation is provided in that the propulsion unit comprises a movable linear carriage driven between the two positions and a stationary slotted guide with a control cam and in that at least one gripper element is mounted for movement in the linear carriage and is rigidly connected to a follower roller guided in the control cam. In the case of the first or second positions mentioned here, these need not necessarily be a mathematically exact point in the course of a movement or along a path. Instead, what may be involved is a region in which a package assumes a first position from which it is moved and is finally placed in a second position. The aforesaid linear carriage can be driven to move between these two positions, the carriage not moving exactly from the point at which the package is in its first position to the second point at which it has rotated through 180°, the movement of the linear carriage being instead, within the meaning of this intention, between two areas which correspond to the two positions of the packages. Therefore, by mechanical linkage it is possible for the path of the movable linear carriage to be quite shortened or lengthened compared with the two exact positions of the package before and after it has been turned.

The teaching of the present invention presupposes a stationary slotted guide with a control cam along which the driven movable linear carriage can be guided. At the same time, the invention teaches that a gripper element is movably mounted in and relative to the linear carriage and that on the basis of a specific control signal the gripper element can grip and release the package. Since the gripper element is rigidly connected to a follower roller, the position of the gripper element and thus also the position of the package will, in the view of the inventor, depend upon the position of the follower roller. It will be understood that the follower roller is rotatable even if the gripper element is stationary.

According to the invention, the aforementioned measures ensure that a package (or several simultaneously) which is delivered on a supply conveyor in a first position can be picked up by a gripper element (or by a plurality simultaneously) and can be moved into a different position by means of the linear carriage. On the way from the first position, which corresponds to the said first position of the package, to the second or final position, which corresponds to the second position of the package (turned over through 180° in respect of the first position), there is a movement of the packages, because the gripper elements, due to their movable mounting, are moved in a desirable manner by means of the follower roller which runs in the control cam.

According to the invention, the control cam is arranged so that the gripper elements first pick up the package in the first position and finally release it in the second position in which the package is turned through 180° out of the first position. Thus, the package is reliably guided and turned through 180°. Crushing of possibly obliquely dropped packages cannot happen with the apparatus according to the invention. Thus, the rejects from a package producing machine will be substantially reduced.

It is also advantageous according to the invention for the gripper element to be rotatably mounted in the linear carriage by means of a shaft and for the control cam which extends between the two positions to have at least one curved portion. By reason of the measures outlined here, the gripper element moves alongside the path of the linear carriage because the gripper element is mounted on the linear carriage. This arrangement is not, however, valid for all the degrees of freedom of movement. Instead, according to the invention, there is a shaft in the linear carriage so that the gripper element mounted on this shaft does indeed perform together with the linear carriage a preferably linear movement but at the same time or regardless of the timing it is still able to perform a rotary movement. The rotary movement provides for the package to be turned over through 180°.

Whereas the carriage described above as a "linear carriage" can also be guided along curved paths, it is however particularly preferred to guide the linear carriage along a straight path with which the slotted guide runs parallel. This parallel extension denotes the path it follows in a curved or flat surface in such a way that in any case the control cam can be bent between two points along its run which correspond to the said two positions of the package. With a curved wall in which the control cam is disposed, it is possible to generate in the space a movement which extends in two different co-ordinates. In the case of a slotted guide in a plane wall, the control cam can obviously be guided along any desired straight and/or curved path.

In other words, as a result of the measures according to the invention, the propulsion unit can be guided as desired so that mechanical parts, preferably the gripper elements, can in any case take the package from a first position and after rotating it through 180°, set it down on a removal conveyor in a second position, while the supply conveyor and the removal conveyor do not by any means have to be disposed in a rectilinear fashion, nor do they need to be parallel with or at the same height as each other. This demonstrates the advantageous versatility of the turnover apparatus according to the invention.

According to the invention, it is preferable for the follower roller to be rotatably mounted on a roller arm which is rigidly connected to the shaft mounted on the gripper element and for the curved portion of the control cam to comprise a portion which is at a maximum distance from a straight line passing through two points corresponding to the two positions, the distance being substantially the same as the length of the roller arm. The roller arm extends, therefore, between the follower roller at its free end on the one hand and the shaft mounted in the linear carriage at its other inner end. The centre of the shaft in the linear carriage and the centre of the follower roller establish two points which define the length of the roller arm. Preferably, the points are in one embodiment so placed on the control cam that between the points corresponding to the two positions of the package, there is to a certain extend one straight and one curved line. In the region of the curved line which is at the greatest distance from the straight line between the two points, the distance being as long as the length of the roller arm, only one such area is at a distance from the straight connecting line between the two points, then the follower roller extends in such a way that the roller arm is rotated at least once through 90° in respect of its starting position. If care is taken to see that the roller arm, after passing through this area which is remote from the straight line, does indeed come to rest again in a position parallel with the starting position, although probably in the opposite direction to its original position, then one does surprisingly have a 180° rotation of the roller arm and thus of the gripper element and thus also of the position of the package.

By reason of the configuration, disposition and drive of the linear carriage which, so to speak, entrains the shaft with the gripper element and thus also the roller arm, the desired mean is achieved whereby the roller arm initially, for instance, pushes its follower roller in front of it in the direction of movement and after it has passed the relevant area, at the shortest distance from the straight line through the two points, pulls it along behind. Thus, the roller arm has been rotated through 180° and so the gripper element has been rotated and also the package has been turned over.

The turnover apparatus according to the invention becomes particularly rugged and simple if the linear carriage is mounted for movement on at least one guide rod extending between two points corresponding to the two positions. It is particularly preferred to have two straight guide rods disposed parallel with and at a distance from each other and to guide the linear carriage by the two rods. A man skilled in the art will, however, appreciate that the linear carriage can be guided on its path equally well by other means or can be stopped in the same position in which it is held on the aforesaid at least one guide rod.

It should once again be pointed out that the guide rod can certainly also be curved but is preferably straight. In the case of a straight construction of the guide rod or rods, this or these will extend parallel with the line between the points corresponding to the two positions of the package at the start and finish. This is not contradicted by the fact that during the course of the movement of the linear carriage the shaft—guided by the control cam—performs in the carriage a rotary movement of 180° between the starting position and the final position.

According to the invention, it is furthermore particularly advantageous for the linear carriage to be fixed to a reciprocating belt. By means of a piston, the propulsion unit can also produce a reciprocating movement of the linear carriage but in that case it will be preferably only to use straight guide rods. However, a propulsion unit with an endless belt running over two jockey wheels can be more rugged, more reliable and more versatile. In practice, a tootned belt of per se known type has been particularly successful. It is expedient if, according to the invention, the linear carriage is fixed on only one belt run, between two jockey wheels. There is no point attaching the carriage to the two oppositely disposed runs because they move in opposite directions.

In the case of a further advantageous development of the invention, two gripper elements are connected one beside the other to a single roller arm and each has movably driven gripper jaws. In this way, the turnover apparatus is suitable for a double working stroke, even though the movement of the gripper elements is still controlled by a single roller arm. The movement of the gripper jaws onto the relevant package or away from it is preferably pneumatic, although other mechanical, hydraulic or electrical means may be used as control elements.

It is furthermore advantageous if, according to the invention, there is in the region of the supply conveyor a monitoring device which delivers control signals and operates the gripper jaws of the gripper elements and rejects defective packages at a rejection position on the control cam. Particularly in the case of the type of packages described at the outset, which have tubular side walls and a folded bottom produced by folding wall panels in an extension of the tube, it can happen that when the filled package is sealed, triangular flaps produced by the folding process are not folded over perfectly and become fastened to the relevant wall. Furthermore, it happens time and time again during the course of long-run mass production that the folding is not performed accurately and, for example, one triangular flap projects at the side in an unprescribed manner. Then the monitoring device, for example by means of a photoelectric cell, detects the fault in the bottom and thus rejects the package. In such a case, the monitoring unit emits an electrical pneumatic or mechanical control signal to the gripper jaws so that these eject the package. The faulty package can be ejected at any desired point between the first position and the second position in which it has been rotated through 180° in relation to the first position. For example, the gripper element can push the package to one side even on the supply conveyor, either by itself or with the help of an ejector. The package can, however, also be ejected during the course of the turnover movement and finally, instead of being thrown onto the removal conveyor, the package could be thrown to one side by the gripper element.

It is, however, particularly expedient if the faulty package is rejected at a suitably chosen location during the turnover process. Here, a rejection position is preferably chosen at which the package or packages will have gained a certain momentum due to the turnover movement, or a certain motional energy to ensure satisfactory throw out or ejection.

Further advantages, features and possible applications of the present invention will emerge from the ensuing description of a preferred embodiment, in conjunction with the accompanying drawings, in which.

Figure 5:
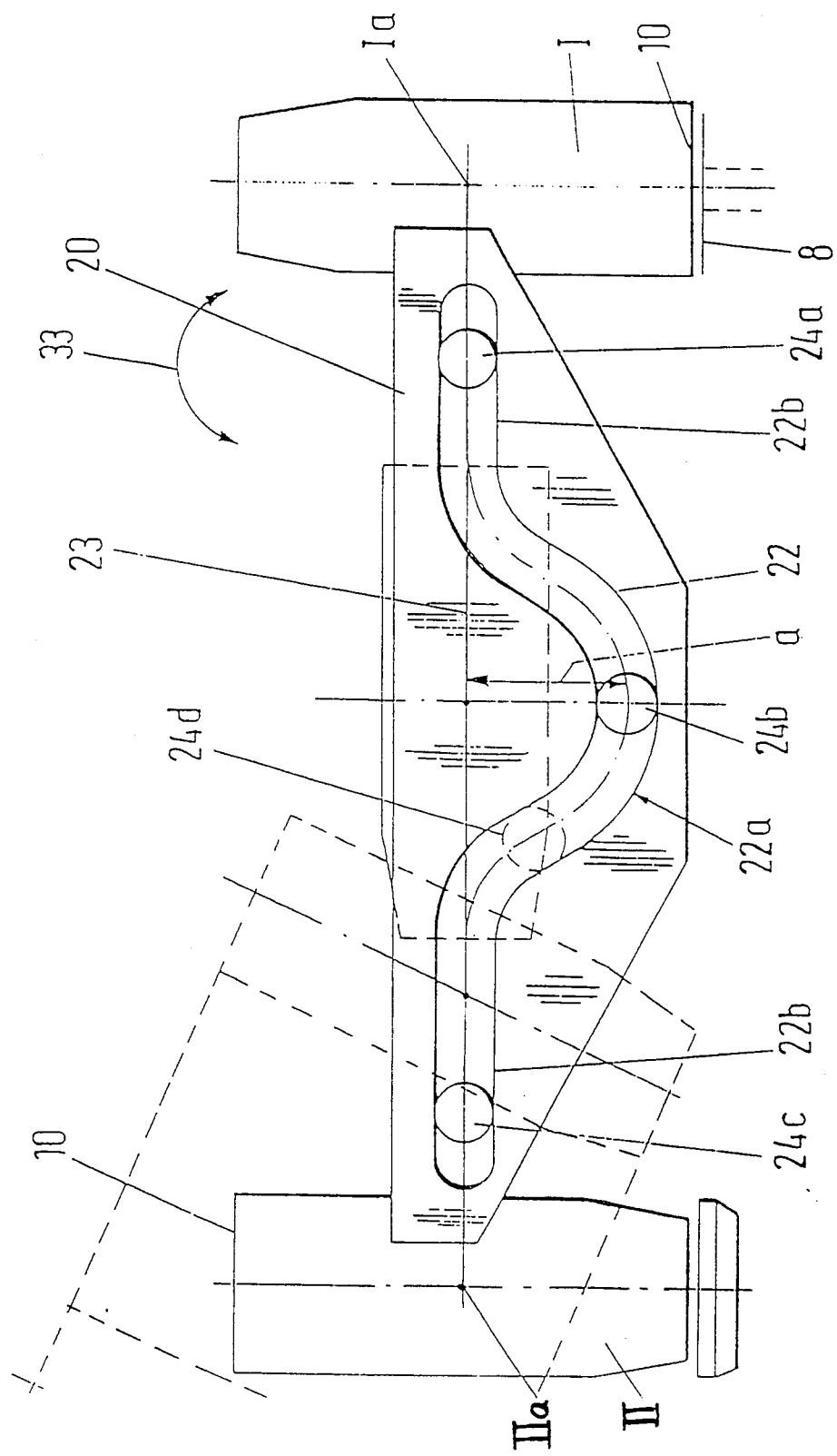

FIG. 5 diagrammatically shows a detail of the slotted guide with the control cam for positioning the gripper element and/or the package.

A frame generally designated 2 is supported by two uprights 3, 3′ on the floor 1 and carries a housing 5, the height of which in relation to the floor 1 can be adjusted by means of a hand wheel 4.

On a supply conveyor 6 with an ejector 8 adapted for movement vertically in the direction of the arrow 7 there is shown by broken lines and in a broken away view a package 9 which is in a first position I in which its top 10 is underneath, i.e. is resting on the ejector 8, while the folded bottom 11 is positioned vertically at the top.

Figure 1:
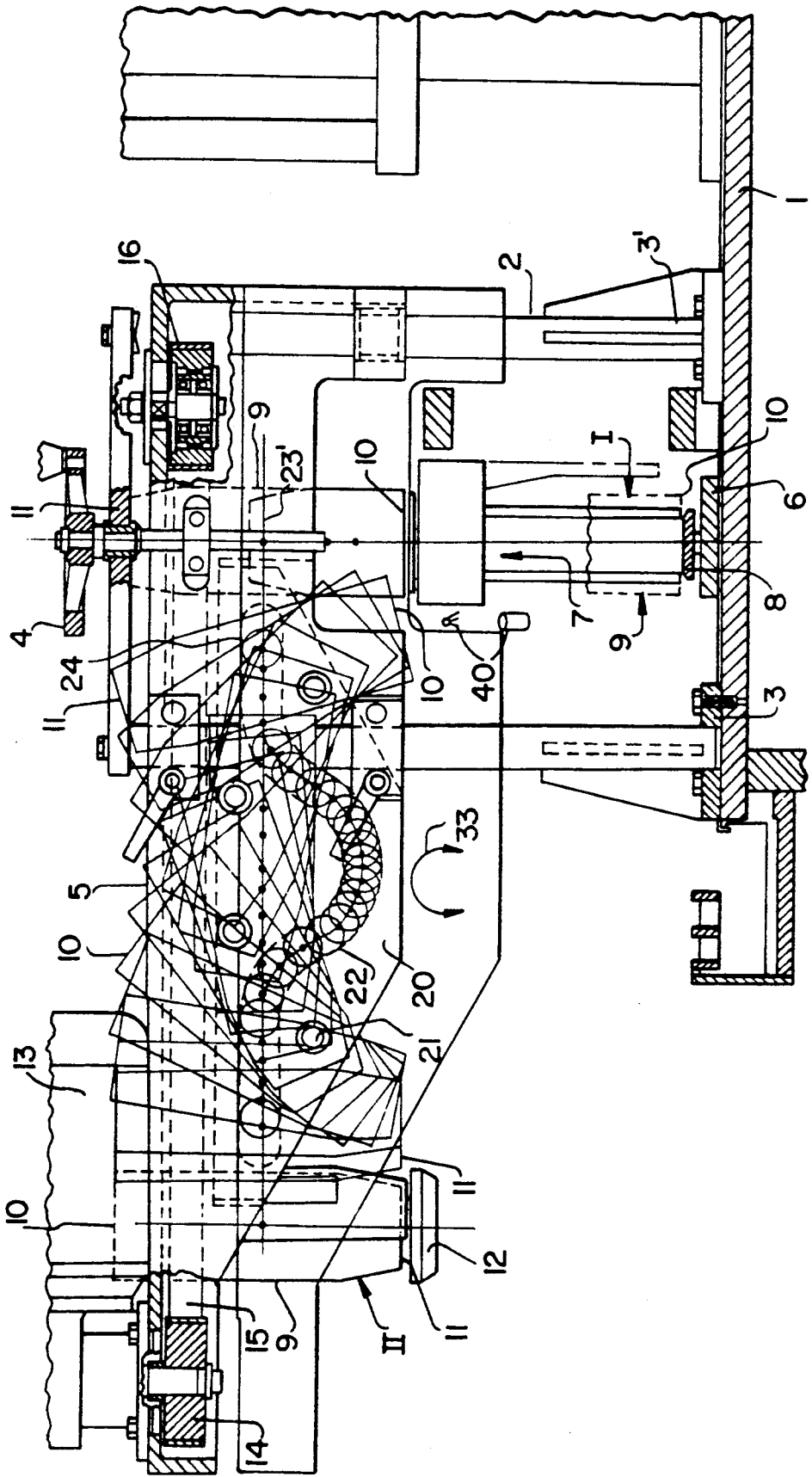
FIG. 1 shows a partly cut away and diagrammatic side view of the turnover apparatus which is shown in vertical section, i.e. the plane of the drawing is vertical.
Figure 2:
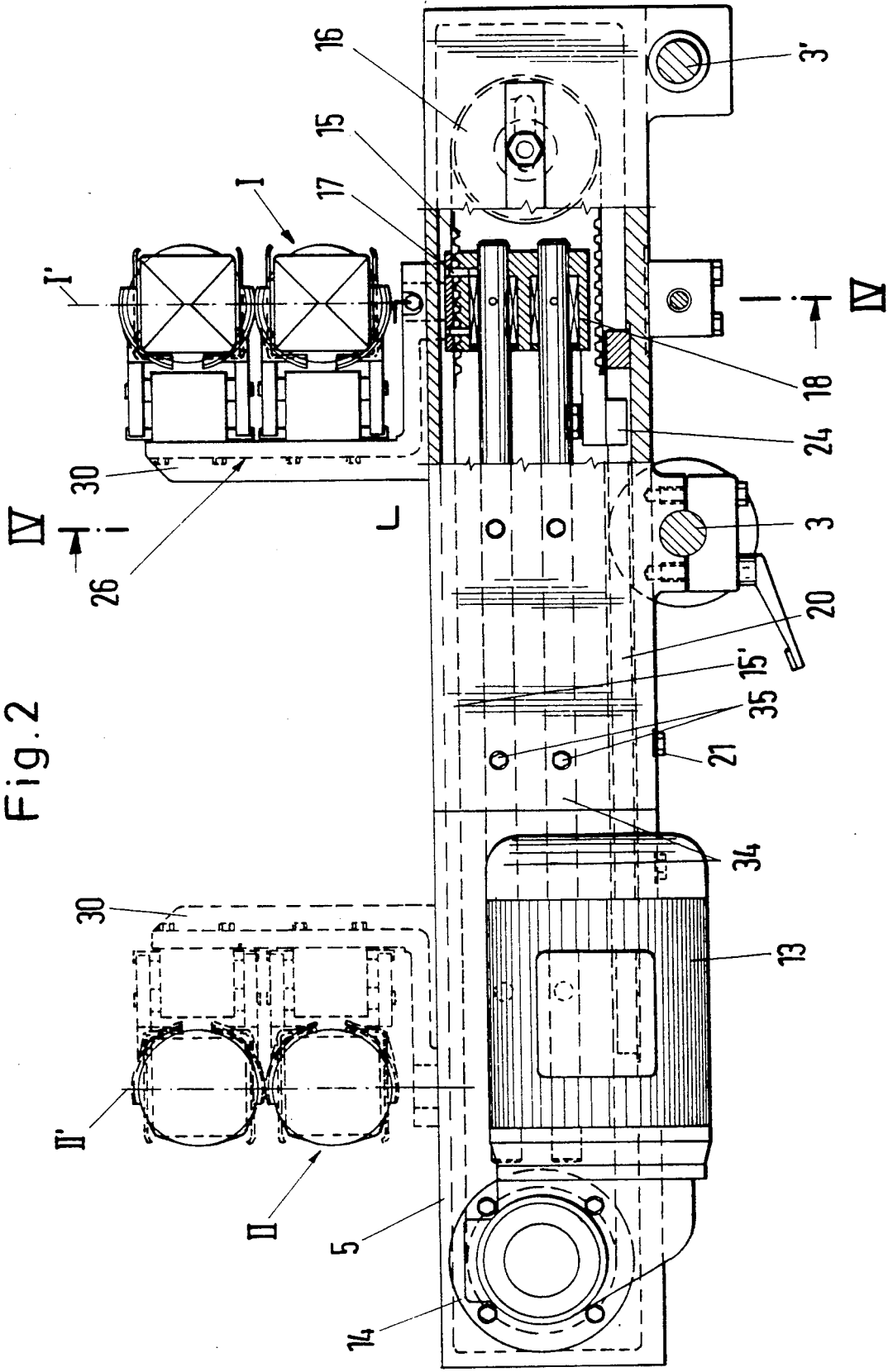
FIG. 2 is a plan view of the turnover apparatus looking down from above in FIG. 1.

From the position I which is shown on the right in FIGS. 1, 2 and 5, it is intended that the package 9 should be turned about an axis in the direction of view of the observer in FIGS. 1 and 5 which is at right-angles to the plane of the paper, through 180° and into a position II which is shown on the left in FIGS. 1, 2 and 5. In this position II, the folded bottom 11 is at the bottom while the lid or top 10 is now at the top, as desired. With the packages 9 now standing "upright" in position II on the removal conveyor 12, the packages can be transported into the apparatus which produces the collective bundles.

Figure 3:
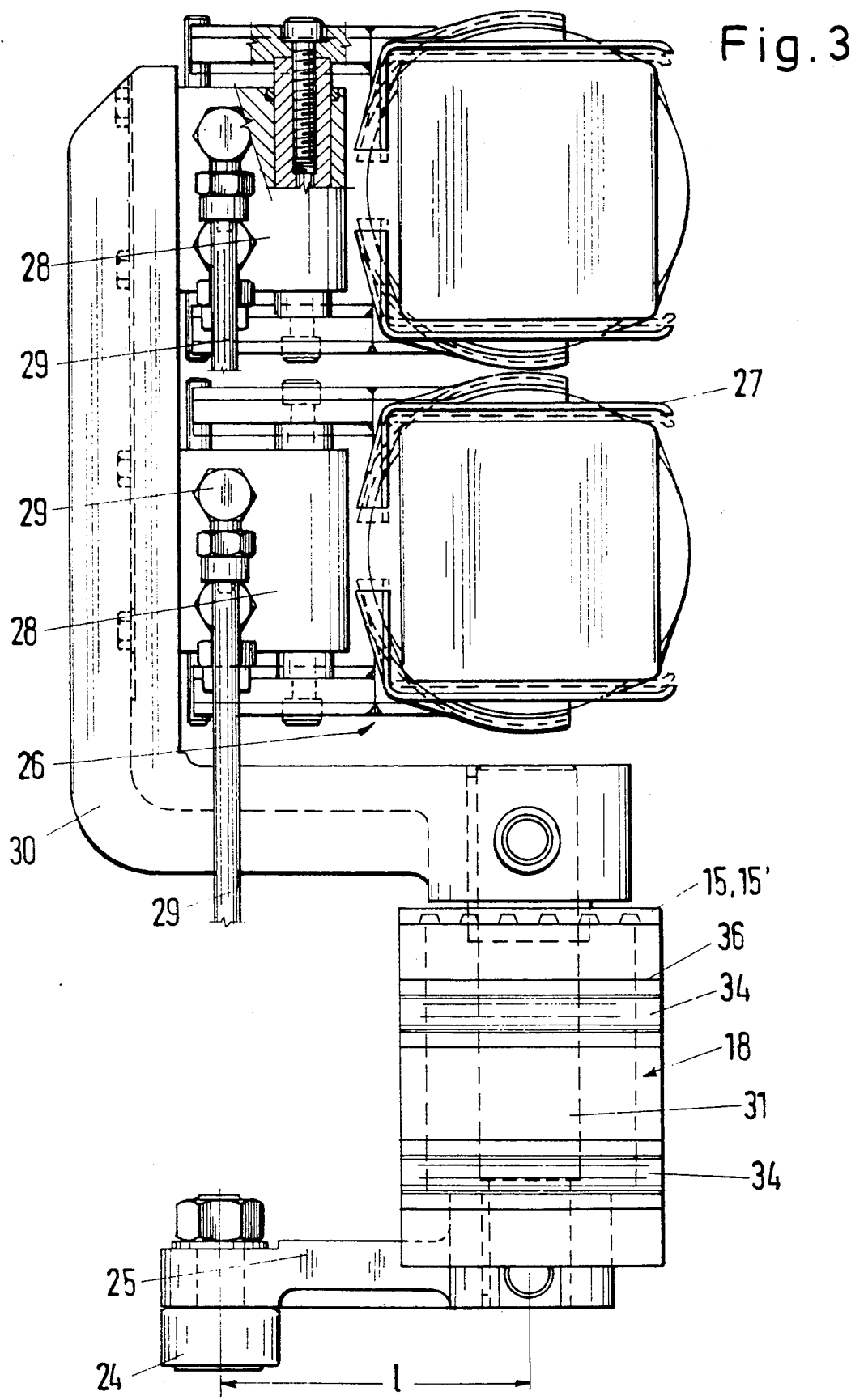
FIG. 3 is a detail from FIG. 2, namely two gripper elements and their mounting on the roller arm with their mounting in the linear carriage.

Disposed on one side of the housing 5 is an electric motor 13 for driving the first jockey wheel 14 around which passes an endless toothed belt 15 which on the opposite side is looped around the other jockey wheel 16. The teeth of this toothed belt 15, as is shown in the drawing, project inwardly as in FIGS. 2 and 3. By means of bolts 17, a linear carriage 18 is fixed to the upper or lower run 15′ of the belt at one location, the belt run being capable of movement to and fro from a point I′ to a point II′, the two points I′ and II′ being particularly clearly shown by lines in FIG. 2. These points I′ and II′ correspond to the first position I and the second position II respectively of the package 9 at the start and finish of the turnover process.

Now, the slotted guide 20 is fixed in a stationary position on the frame 2 by screws 21. The guide consists of a flat thick metal plate into which a control cam 22 or curve is milled. This is shown particularly clearly in FIG. 5. It lies partly on a straight line 23 which can be regarded as the shortest distance connecting two points I′ and II′ and it has at least one curved portion 22a. At this juncture, attention should be drawn to the fact that the points Ia and IIa do indeed correspond to the positions I and II of the package before and after the turnover process but in any case they do not have to correspond to the position which is shown as a special case in FIG. 5. With the embodiment shown here or in the special case, these points Ia and IIa fall on the lines I′ and II′ in FIG. 2, i.e. the end-middle points of the movement of the linear carriage 18.

Figure 4:
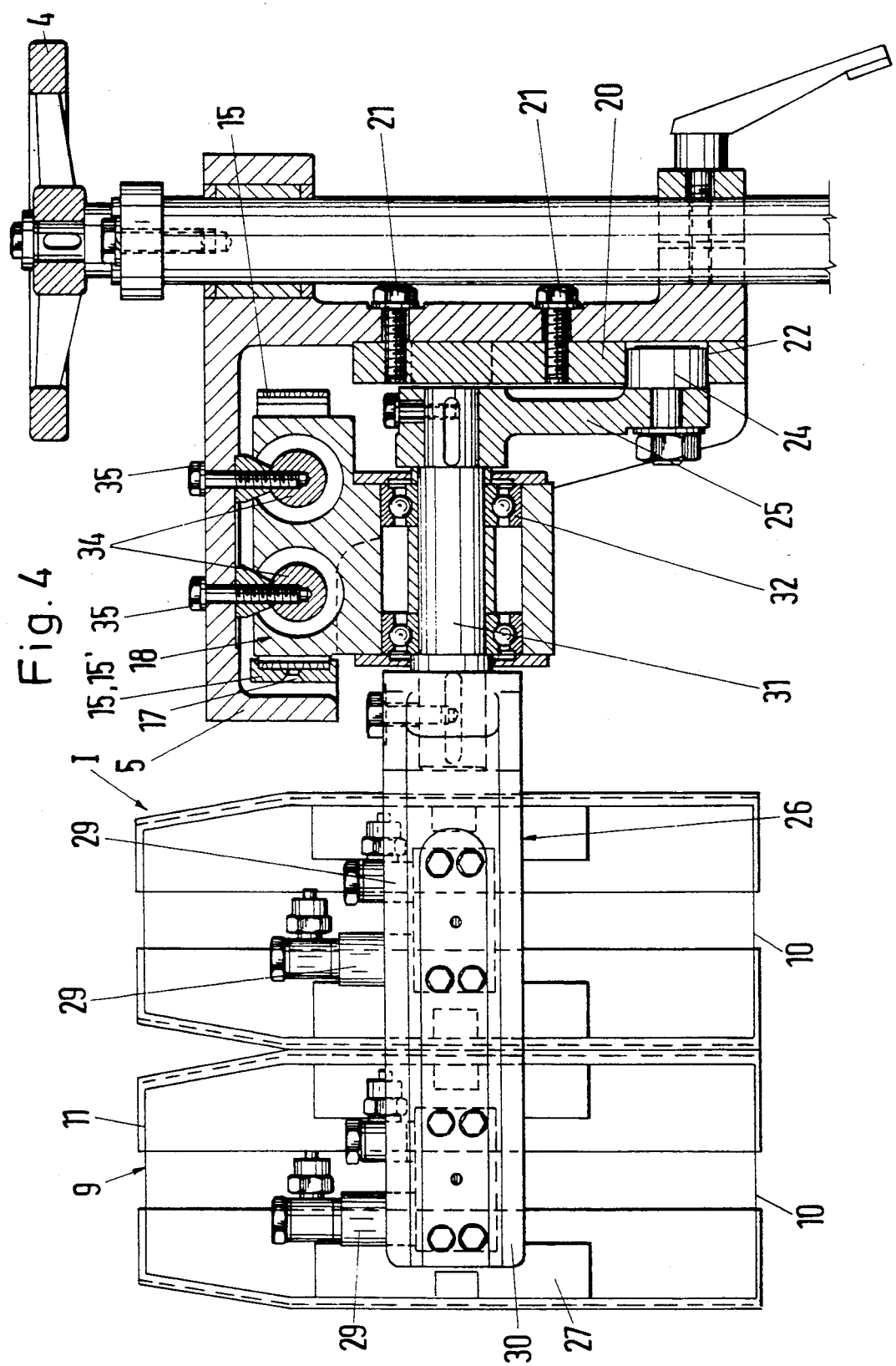
FIG. 4 is a sectional view taken on the line IV—IV in FIG. 2.

Guided in the control cam 22 is a follower roller 24 which is rotatably carried by a roller arm 25. This roller arm and its length l can be seen particularly in FIGS. 3, while FIG. 4 also shows it in a perpendicular position. In this respect, it must be mentioned that the bottom part of the section line IV—IV in FIG. 2 is actually in the centre between the points I′ and II′ of the path of movement of the linear carriage 18. This can be understood by looking at FIG. 5 because that shows four different positions 24a, 24b, 24c and 24d of the follower roller 24. In the positions 24a and 24c, the roller arm 25 is horizontal, i.e. substantially in the plane of the paper in FIG. 2 or parallel above or below it, or alternatively position 24b as in FIG. 4 shows the vertical position.

The propulsion unit described comprises not only the linear carriage 18 and the belt 15, the slotted guide 20, the control cam 22 but also the gripper element generally designated 26. The essential parts of the gripper elements 26 which are shown particularly clearly in FIG. 3 and which are disposed in pairs are the gripper jaws 27 adapted for movement by pneumatic cylinders 28 and connections 29, between the release position shown by solid lines in FIG. 3 and the clamping position shown by broken lines in FIG. 3. The supports for the gripper jaw 27 and the pneumatic drive 28, 29 are formed by supports 30 (FIG. 3) which are L-shaped when viewed in plan. These supports are rigidly connected to a shaft 31 which, according to a particularly clear illustration in FIG. 4, engages through the linear carriage 18 and, on the side opposite the support 30, is rigidly connected to the roller arm 25. As a result of ball bearings 32 (FIG. 4), the shaft 31 of the gripper element 26 is rotatable in respect of the linear carriage 18 in the direction of the double-headed arrow 33 in FIGS. 1 and 5. Together with the rotation of the shaft 31, also the roller arm 25 rotates and with it also the supports 30 and also the gripper elements 26.

The linear carriage 18 is shown in section in FIG. 4 and carries in its bottom part the shaft 31 as described hereinabove and is itself in its upper part where it is also driven by the toothed belt 15 in the region of the bolts 17, carried by two spaced-apart and mutually parallel guide rods 34. The guide rods are fixed to the housing 5 by screws 35 which extend through longitudinal slots 36 in the linear carriage 18. In this way, the open bottomed U-shaped housing 5 supports the guide rods 34 and yet the linear carriage 18 is able to move along the guide rods 34 within this U-shaped housing 5.

The slotted guide 20 fixed by screws 21 in a stationary position on the one vertically extended flange of the U-shaped housing 5 is therefore a rigid and flat panel which extends essentially between the positions I and II of the packages 9. FIG. 5 shows the pattern of the control cam 22 which has at both ends a linear portion 22b and in between them a curved portion 22a so that the region designated 24b in FIG. 5 is at the greatest distance a from the straight line 23. It has already been mentioned above that this straight line 23 passes through two points Ia and IIa which correspond to the two positions I and II of the package 9. If the distance a (FIG. 5) is equal to the length l of the roller arm 25, then necessarily the roller arm 25 must in the position 24b of the follower roller 24 be vertical or at right-angles to the line 23, as can be readily seen by observing the movement described hereinafter, particularly as it is illustrated in FIG. 5.

The way the turnover apparatus functions will now be explained with reference to the movement which will be described.

A package 9 delivered on the supply conveyor 6 and which is sealed and filled with liquid is moved by the ejector 8 in the direction of the arrow 7 out of the position shown by broken lines at the bottom in FIG. 1 into the position which is only partly in broken lines at the top. If a triangular flap on a faulty package is projecting, then this is immediately detected by the monitoring device 40 which emits a control command to the gripper element 26 to release the gripper jaws 27. This happens at the ejection position 24d which is to be described hereinafter (FIG. 5).

All perfectly filled and sealed packages which by now have been raised to the topmost level corresponding to the line 23' (FIG. 1) are, when the appropriate commands are given, picked up by the gripper elements 26 and are clamped by the gripper jaws 27. Here the relevant gripper element 26 is in the right-hand position shown in FIGS. 1 and 2.

When the electric motor 13 is switched on, the linear carriage 18 is moved by the toothed belt 15 out of the position on the right in FIGS. 1 and 2 into the left-hand position shown by broken lines in FIG. 2. Together with the linear carriage 18, therefore, also the support 30 with the gripper elements 26 moves parallel with the guide rods 34.

It can already be seen from FIG. 2 that a turn over or rotation of the packages 9 through 180° must have taken place for in the right-hand position the support 30 is on the left and in the left-hand position it is on the right-hand side. Thus the relevant package 9 has been moved out of the upside down position I into the right way up position II in which the lid is at the top.

This turning over is brought about by the control cam 22.

FIG. 5 shows that the follower roller 24, when it leaves the starting position 24a, is firstly guided linearly for a distance so that the linear carriage 18 (see FIG. 2) so to speak pushes the roller arm 25 in front of it in a substantially horizontal position.

If, now, the control cam 22 moves into its curved portion 22a, while the linear carriage 18 is moving from right to left as shown in FIGS. 1, 2 and 5, then the roller arm 25 starts to rotate in an anti-clockwise direction as indicated by the double-headed arrow 33. However, the longitudinal central axis of the packages 9 disposed in the gripper elements 26 also rotates. This transition of the rotation can be clearly seen in FIG. 1 where the individual intermediate positions of the package which is in the course of being turned over are clearly shown.

When the follower roller 24 has reached the positions 24b in FIG. 5, then the roller arm 25 is pointing vertically downwards, the portion 24b being at a distance a from the line 23 so that it virtually loses the pushing drive from the linear carriage 18. While this is happening, however, the linear carriage moves farther leftwards in the direction of the position II so that after leaving the position 24b the follower roller 24 is now entrained by the roller arm 25. In other words, the roller arm 25 also rotates between the position 24b and 24c of the follower roller 24, in an anticlockwise direction as indicated by the double-headed curved arrow 33, so that, as can be clearly seen in FIG. 1, the package still assumes the correct position II. Finally, it is set down on the removal conveyor 12 because the gripper jaws 27 release the package 9 in the position II.

If, in the meantime, a defective package with projecting triangular flaps has been detected by the monitoring device 40 and has been conveyed by the gripper elements 26, then the gripper jaws 27 receive no later than at the ejection position designated 24d in FIG. 5 the signal to release the packages so that they can be thrown aside with momentum.

We claim:

1. An apparatus for turning a container about an axis, which comprises means for gripping a container, said gripping means comprising an arm, carriage means rotatably supporting said gripping means, said gripping means being mounted for rotation in said carriage means about an axis passing through a container held by said gripping means, linear guide means for guiding said carriage means, said linear guide means comprising rail means, said carriage means having apertures therein which slidably engage said rail means, drive means for moving said carriage means and gripping means between first and second stations along said linear guide means, stationary guide means positioned between said first and second stations and adapted to engage with said arm and turn said gripping means about said axis passing through said container held by said gripping means with linear movement of said carriage means.

2. An apparatus for turning a container about an axis, which comprises means for gripping a container, said gripping means comprising an arm, carriage means rotatably supporting said gripping means, said gripping means being mounted for rotation in said carriage means about an axis passing through a container held by said gripping means, linear guide means for guiding said carriage means, said linear guide means comprising rail means, said carriage means having apertures therein which slidably engage said rail means drive means for moving said carriage means and gripping means between first and second stations along said linear guide means, stationary guide means positioned between said first and second stations comprising a curved slot adapted to engage with said arm and turn the arm and gripping means 180° about said axis passing through said container held by said gripping means with linear movement of said carriage means.

3. The apparatus of claim 2 wherein the stationary guide means comprises a slotted control cam a portion of which is curved to rotate the arm and gripping means 180° with linear movement of said carriage means.

4. The apparatus of claim 3 wherein said gripping means comprises shaft means rotatably mounted in said carriage means and rigidly connected to said arm, follower means rotatably mounted to said arm for movement in said slotted cam, the maximum distance between the curved portion of the cam and the axis of linear movement of said carriage being substantially equal to the length of said arm.

5. The apparatus of claim 3 wherein said drive means for linear movement of said carriage means comprises means for producing reciprocating movement.

6. The apparatus of claim 5 wherein said gripping means comprises a plurality of gripper jaws.

7. The apparatus of claim 6 wherein said first and second stations comprise supply conveyor means to said apparatus and delivery conveyor means away from said apparatus, respectively.

8. The apparatus of claim 6 including monitoring means for automatically actuating said gripper jaws.

9. The apparatus of claim 3 including monitoring means for detecting and ejecting faulty containers.

* * * * *